(12) United States Patent
Pelissier et al.

(10) Patent No.: US 6,441,595 B1
(45) Date of Patent: Aug. 27, 2002

(54) UNIVERSAL COMPACT PCI PULL-UP/ TERMINATION IC

(75) Inventors: Gerald R. Pelissier, Austin, TX (US); David S. Hwang, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/693,447

(22) Filed: Oct. 20, 2000

(51) Int. Cl.$^7$ ............................. G05F 1/40; G05F 3/16
(52) U.S. Cl. ..................... 323/281; 323/313; 327/553
(58) Field of Search ............................. 323/281, 312, 323/313, 314, 315, 272; 327/553, 362, 142, 77

(56) References Cited

U.S. PATENT DOCUMENTS

| | | | | |
|---|---|---|---|---|
| 5,568,045 A | * | 10/1996 | Koazechi | 323/314 |
| 5,689,202 A | * | 11/1997 | Ranson | 327/142 |
| 6,097,244 A | * | 8/2000 | Chen | 327/553 |

* cited by examiner

Primary Examiner—Rajnikant B. Patel

(74) Attorney, Agent, or Firm—Rosenthal & Osha L.L.P.

(57) ABSTRACT

A device for automatically providing variable resistance includes a comparator for comparing a reference voltage to an operating voltage, a first switch operatively coupled to the comparator, a first resistor operatively coupled with the first switch in a series connection between a pull-up voltage and a signal line, a second switch operatively coupled to the comparator, and a second resistor operatively coupled in a series connection with the second switch between the pull-up voltage and the signal line. The first switch selectively electrically enables the connection between the pull-up voltage and the signal line through the first resistor based on the comparison between the reference voltage and the operating voltage and the second switch selectively electrically enables the connection between the pull-up voltage and the signal line through the second resistor based on the comparison between the reference voltage and operating voltage. A method of automatically providing variable resistance includes comparing a control voltage and a reference voltage, selectively pulling-up a signal line to a pull-up voltage through a first resistor and a first switch operatively connected in series if the comparison has a first outcome, and selectively pulling-up the signal line to the pull-up voltage through a second resistor and a second switch operatively connected in series if the comparison has a second outcome.

29 Claims, 4 Drawing Sheets

UNIVERSAL COMPACT PCI PULL-UP/TERMINATION IC

BACKGROUND OF THE INVENTION

Referring to FIG. 1, computer systems generally comprised of, among other elements, a motherboard (10), a central processing unit (CPU) (12), memory (14), and a plurality of circuit cards (16) for controlling components, performing functions, and the like. Most of these elements are inserted or otherwise electrically connected to the motherboard. Computer system components are generally connected via buses (18) or an electrically conductive path traced along the motherboard. These buses are used for data transfer among the components. Further, power is delivered to the motherboard through a power connection (20). Then, depending on the component, power is supplied indirectly from the motherboard (10) or directly via a power connection on the component. In certain systems, the elements can be removed from or inserted into the computer while the system is running, i.e., the elements can be "hot-swapped."

There exist standard specifications that allow the combination of components from different manufacturers. ISA (Industry Standard Architecture) is a bus specification that is based on the specification used in the IBM PC/XT and PC/AT. PCI (Peripheral Component Interconnect) is a local bus specification developed for 32-bit or 64-bit computer system interfacing. Most modem computers have both an ISA bus for slower devices and a PCI bus for devices that need better bus performance. Another specification, VME (VersaModule Eurocard bus), is a 32-bit bus widely used in industrial, commercial, and military applications. VME64 is an expanded version that provides 64-bit data transfer and addressing.

While it is generally cost effective to have most of the circuitry on a single large motherboard for desktop computers, such a configuration has certain drawbacks that are particularly important to industrial applications. Because the motherboard is usually thin and large enough to flex, breakage of small traces and solder joints on fine pitch surface mount devices may occur when plug-in boards are inserted. The occurrence of such breakage requires motherboard replacement, which in turn requires complete disassembly and reassembly of the computer system.

Particularly in industrial applications, such disassembly and reassembly, and the accompanying downtime, may be unacceptable. Also, given the rapid development of motherboard technology, finding an exact replacement for a motherboard can be difficult or impossible. Further, substitution of a non-exact replacement may cause software problems due to BIOS changes, changing device drivers, and different timing. Thus, standard specifications have been developed for systems and boards designed for use in industrial and telecommunications computing applications.

The PCI-ISA passive backplane standard defines backplane and connector standards for plug-in passive backplane CPU boards that bridge to both PCI and ISA buses. The PCI-ISA passive backplane standard moves all of the components normally located on the motherboard to a single plug-in card. The motherboard is replaced with a "passive backplane" that only has connectors soldered to it.

CompactPCI is a specification for PCI-based industrial computers that is electrically a superset of PCI with a different physical form factor. CompactPCI uses the Eurocard form factor popularized by the VME bus.

In the PCI specification, it was possible to select a single value for the pull-up resistor that would satisfy the requirement for both 3.3V and 5V backplanes. Therefore, it was possible to create Universal Signaling Environment capable cards. There is a mechanism defined by the PCI specification where the "signaling environment" of the bus is defined by the value of the pins receiving the input/output (I/O) voltage, i.e., the VIO pins (either 3.3V or 5V). Thus, a universal card uses the I/O voltage VIO to define its own I/O voltage, rather than fixing it at 5V or 3.3V.

The CompactPCI bus architecture supports the 3.3V signaling environment, the 5V signaling environment, and hot swap. These features have the following corresponding requirements. The 3.3 V signaling environment requires 2.7K Ohm ($\omega$) (+/-5%) pull-up resistors. The 5V signaling environment requires 1.0K$\omega$ (+/-5%) pull-up resistors. Hot Swap requires that all pins be biased at 1V (+/-20%) using a minimum 10K$\omega$ pull-up resistor. Further, the Compact PCI specification has the additional requirements of a 10$\omega$ series termination resistor on every signal within 0.6" of the connector pin, no more than 10 Pico-Farad (pf) capacitive load on any shared bus signal on a non-system slot board, and no more than 20 pf capacitive load on any shared bus signal on a system slot board.

There are two types of "universal" boards: Universal signaling environment and universal slot location. Universal signaling environment means that a board can operate in either a 3.3V or 5V bus backplane. With the original PCI specification, it was possible to select a value for the bus pull-up resistor that satisfied the specification for both the 3.3V and 5V signaling environments. With the new CompactPCI Specification, it is no longer possible to select a single resistor. Therefore, in order to be a universal signaling environment capable CompactPCI board, a board must provide both 2.7K$\omega$ (+/-5%) and 1.0K$\omega$ (+/-5%) pull-up resistors and provide a way to enable them correctly depending on the signaling environment.

Universal slot location describes a board that can function in either the system slot or non-system slot of a CompactPCI backplane. A system slot board is required to provide the common bus resources for the CompactPCI backplane, namely: bus pull-ups, ebus clock, and the bus arbiter. A system slot board is allowed additional capacitive load per signal pin because of these additional features. In order to be CompactPCI Hot Swap Specification compliant, every signal pin must be biased to (1V +/-20%) through a minimum 10K$\omega$ resistor prior to insertion into a live or "hot" backplane.

Those skilled in the art will appreciate that other requirements exist in the full CompactPCI, Hot Swap, and Passive Backplane PCI-ISA specifications which are available from PCI Industrial Computer Manufacturers Group of Wakefield, Ma. and are hereby incorporated in their entirety by reference.

SUMMARY OF THE INVENTION

In one aspect, a device for automatically providing variable resistance comprises a comparator for comparing a reference voltage to an operating voltage; a first switch operatively coupled to the comparator; a first resistor operatively coupled with the first switch in a series connection between a pull-up voltage and a signal line; a second switch operatively coupled to the comparator; and a second resistor operatively coupled in a series connection with the second switch between the pull-up voltage and the signal line. The first switch selectively electrically enables the connection between the pull-up voltage and the signal line through the first resistor based on the comparison between the reference voltage and the operating voltage and the second switch selectively electrically enables the connection between the pull-up voltage and the signal line through the second resistor based on the comparison between the reference voltage and operating voltage.

In one aspect, a method of automatically providing variable resistance comprises comparing a control voltage and a reference voltage; selectively pulling-up a signal line to a pull-up voltage through a first resistor and a first switch operatively connected in series if the comparison has a first outcome; and selectively pulling-up the signal line to the pull-up voltage through a second resistor and a second switch operatively connected in series if the comparison has a second outcome.

In one aspect, an apparatus for automatically providing variable resistance comprises means for comparing a control voltage and a reference voltage; means for selectively pulling-up a signal line to a pull-up voltage through a first resistor and a first switch operatively connected in series if the comparison has a first outcome; and means for selectively pulling-up the signal line to the pull-up voltage through a second resistor and a second switch operatively connected in series if the comparison has a second outcome.

In one aspect, a system for automatically varying resistance comprises a voltage supply for supplying a reference voltage and an operating voltage; a signal line requiring a pull-up resistance of a differing value depending on the operating voltage; a comparator for comparing the reference voltage and the operating voltage; a first switch operatively coupled to the comparator; a first resistor operatively coupled with the first switch in a series connection between a pull-up voltage and a signal line; a second switch operatively coupled to the comparator; and a second resistor operatively coupled in a series connection with the second switch between the pull-up voltage and the signal line. The first switch selectively electrically enables the connection between the pull-up voltage and the signal line through the first resistor based on the comparison between the reference voltage and the operating voltage and the second switch selectively electrically enables the connection between the pull-up voltage and the signal line through the second resistor based on the comparison between the reference voltage and the operating voltage.

In one aspect, an apparatus for providing variable resistance, comprises a voltage supply for supplying a reference voltage and an operating voltage; a signal line requiring a pull-up resistance of a differing value depending on the operating voltage; a comparator for comparing the reference voltage and the operating voltage; a first switch operatively coupled to the comparator; a first resistor operatively coupled with the first switch in a series connection between a pull-up voltage and a signal line; a second switch operatively coupled to the comparator; and a second resistor operatively coupled in a series connection with the second switch between the pull-up voltage and the signal line. The first switch selectively electrically enables the connection between the pull-up voltage and the signal line through the first resistor based on the comparison between the reference voltage and the operating voltage and the second switch selectively electrically enables the connection between the pull-up voltage and the signal line through the second resistor based on the comparison between the reference voltage and the operating voltage. The signal line requires a bias voltage at an insertion time. Also included are a bias control signal indicating the insertion time; and a third resistor operatively coupled in a series connection with a third switch between a bias voltage and the signal line. The third switch is operatively coupled to the bias control signal and the third switch selectively electrically enables the connection between the bias voltage and the signal line through the third resistor based on the bias control signal. The signal line requires a connection to an auxiliary output terminal at a dual-load time. Further included are a dual-load control signal indicating the dual-load time; and a fourth switch operatively between the auxiliary output terminal and the signal line. The fourth switch is operatively coupled to the dual-load control signal and the fourth switch selectively connects the signal line and the auxiliary output terminal based on the dual-load control signal. Other aspects and advantages of the invention will be apparent from the following description and the appended claims.

DETAILED DESCRIPTION OF THE INVENTION

Figure 1:
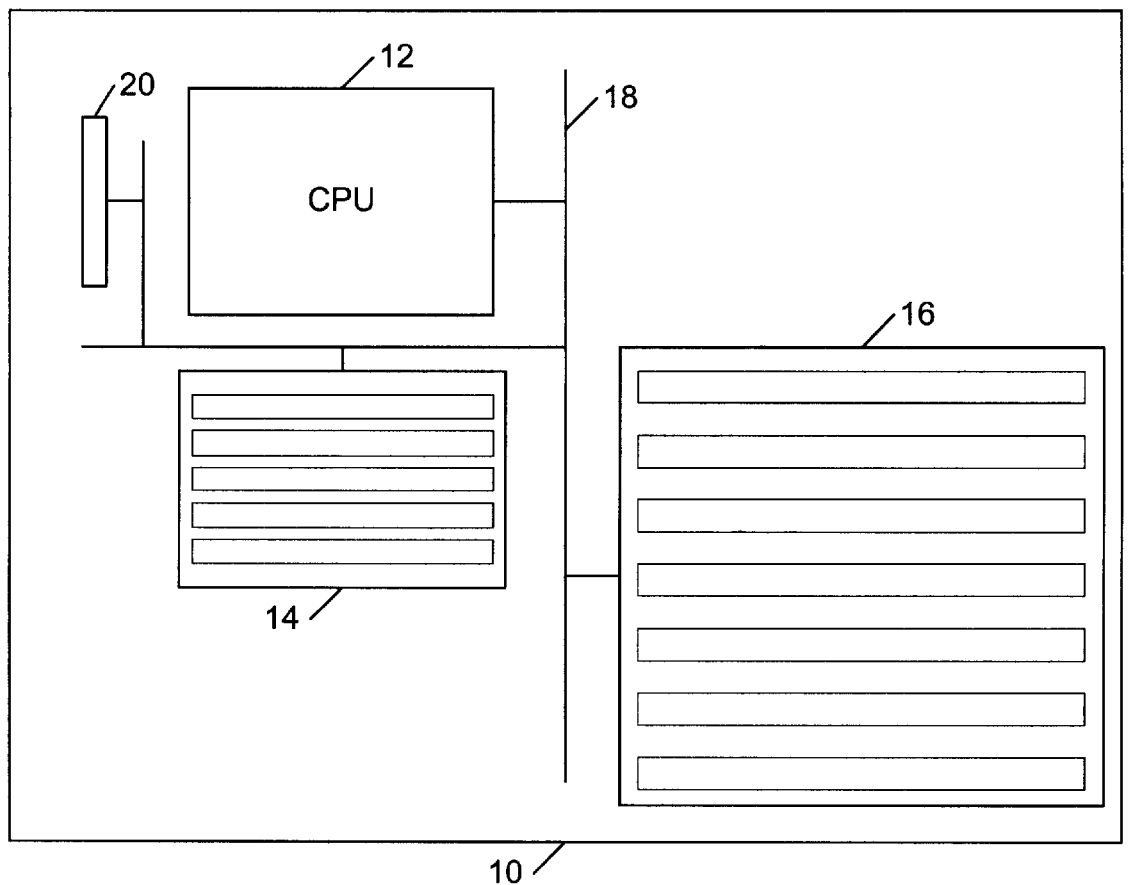
FIG. 1 a block diagram of a typical computer.
Figure 2:
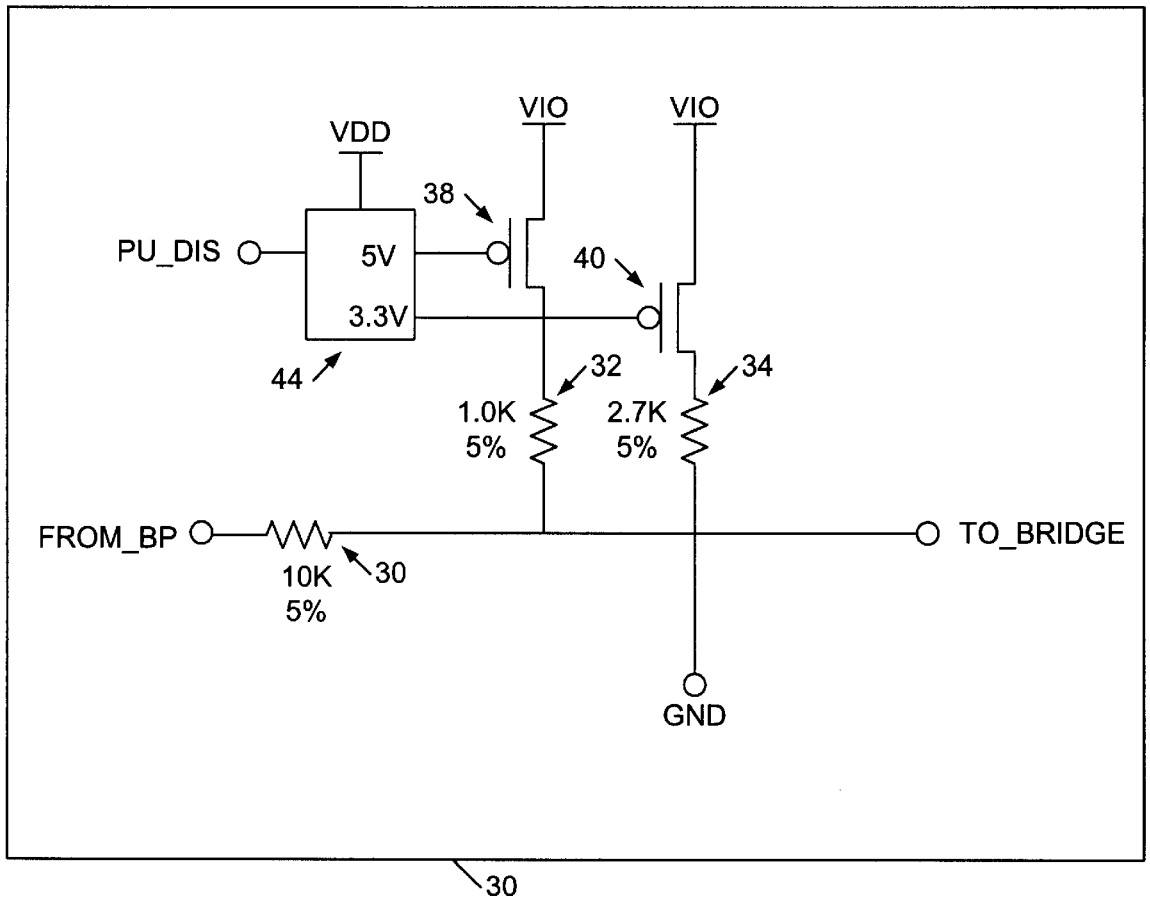
FIG. 2 is a block diagram in accordance with an embodiment of the present invention.

In one or more embodiments, the present invention involves a device that allows a board to be configured in any combination of signaling environment and system slot versus non-system slot operation in addition to meeting CompactPCI series termination and pre-charge bias requirements. Referring to the drawings wherein like reference characters are used for like parts throughout the several views, FIG. 2 shows a block diagram in accordance with an embodiment of the present invention. The exemplary embodiments presented below are discussed with reference to voltages, the present invention is equally applicable to connections to any signal, i.e., electrical, optical, etc.

Referring to FIG. 2, a custom IC package (30) includes a 1.0K$\omega$ pull-up resistor (32) and a 2.7K$\omega$ pull-up resistor (34) each with switches, e.g., transistors (38, 40), that can enable/disable the pull-up resistor. An auto-detect circuit (44) enables either the 1.0K$\omega$ pull-up resistor (32) or the 2.7K$\omega$ pull-up resistor (34) by controlling transistor (38) and transistor (40) respectively. In accordance with the CompactPCI specification, the 1.0K$\omega$ pull-up resistor (32) or the 2.7K$\omega$ pull-up resistor (34) will be appropriate based on the signaling environment. As can be seen, terminal (FROM_BP) and terminal (TO_BRIDGE) are included for connection the signal line from the backplane of the board to the bridge of the board. This signal line passes through a 10K$\omega$ resistor (30) and is pulled-up by either the 1.0K$\omega$ pull-up resistor (32) or the 2.7K$\omega$ pull-up resistor (34) depending on which pull-up resistor is enabled. Finally, the signal line is connected to ground through terminal (GND). Those skilled in the art will appreciate that the 10K$\omega$ resistor (30) may be located outside the IC (30), if desired or required due to design constraints.

The pull-up resistors (32) and (34) are connected to the input/output voltage (VIO) through transistors (38) and (40). As stated above, the auto-detection circuit (44) enables the appropriate pull-up resistor value given the signaling environment. The auto-detection circuit (44) may be implemented using a comparator circuit that compares the input/output voltage (VIO) with a reference voltage (VDD). The reference voltage (VDD) can be either 3.3V or 5V depending on how the comparator is connected to the enable/disable switches for the pull-up resistors. Also, a pull-up disable signal (PU_DIS) is connected to the auto-detection circuit (44) to disable both pull-up resistors. The disable signal (PU_DIS) is included because the board may be located in either the system slot, which requires bus pull-up resistors, or a satellite slot, which must not provide pull-up resistors.

Figure 3:
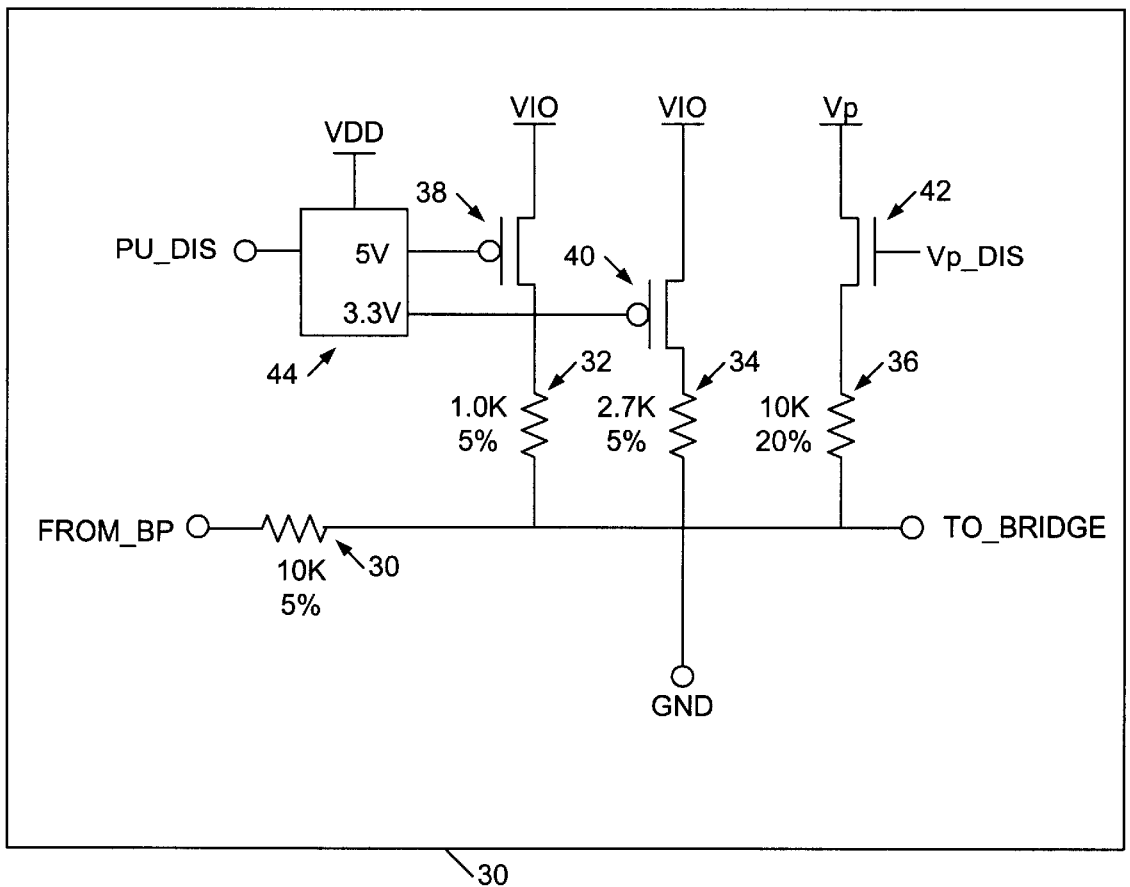
FIG. 3 is a block diagram in accordance with an embodiment of the present invention.

Pre-charge bias on CompactPCI hot swap boards requires that all CompactPCI bus signals be pulled up to either 1V (+/−20%) (Vp) or the input/output voltage (VIO) through a 10KΩ or greater resistor. Referring to FIG. 3, in one embodiment, in addition to the auto-detection circuitry described above, a 10KΩ pull-up resistor (36) is included. The 10KΩ pull-up resistor (36) is connected to Vp through a switch, e.g., transistor (42). Transistor (42) is used to enable/disable the 10KΩ pull-up resistor (36) based on the control signal (Vp_DIS). The enable/disable switch is included because the pre-charge bias voltage is only used during board insertion.

Figure 4:
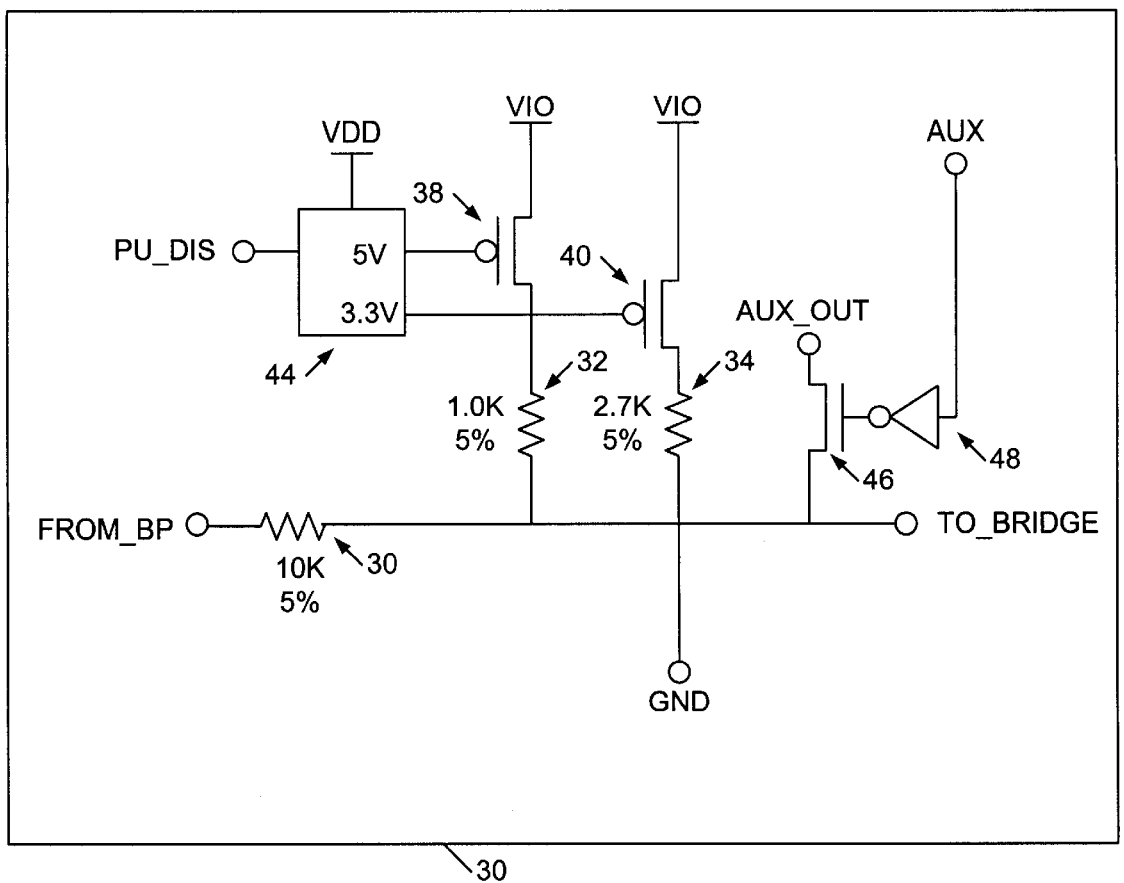
FIG. 4 is a block diagram in accordance with an embodiment of the present invention.

Referring to FIG. 4, in one embodiment, an auxiliary output terminal (AUX_OUT) is included. CompactPCI specifications require that there be no more than one load on a board, unless the board is located is the system controller slot. In order to meet the CompactPCI specification and in view of the fact that some signals will have two loads, the second output terminal (AUX_OUT) is provided. As can be seen, the output terminal (AUX_OUT) is connected through an enable/disable switch, e.g., transistor (46). In the exemplary embodiment shown, the auxiliary enable signal is passed through an inverter (48) to the control transistor (46).

Advantages of the present invention may include one or more of the following. In one or more embodiments, a custom IC provides a properly valued pull-up resistor based on the current signaling environment of the board. Further, bias circuitry allows the board to be hot swappable in accordance with CompactPCI specifications. Also, a minimized capacitive load is provided to CompactPCI signal pins. Cost is reduced because several discrete components are integrated into a single specialized IC. Further, by integrating all of the features in an IC, board space is saved. Saving space is important in dense signal board computers such as CompactPCI boards. Board design is made easier, which saves potential development costs.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A device for automatically providing variable resistance comprising:
   a comparator for comparing a reference voltage to an operating voltage;
   a first switch operatively coupled to the comparator;
   a first resistor operatively coupled with the first switch in a series connection between a pull-up voltage and a signal line;
   a second switch operatively coupled to the comparator; and
   a second resistor operatively coupled in a series connection with the second switch between the pull-up voltage and the signal line,
   wherein the first switch selectively electrically enabling the connection between the pull-up voltage and the signal line through the first resistor based on the comparison between the reference voltage and the operating voltage and the second switch selectively electrically enabling the connection between the pull-up voltage and the signal line through the second resistor based on the comparison between the reference voltage and operating voltage.

2. The device of claim 1 further comprising:
   a third resistor operatively coupled in a series connection with a third switch between a second pull-up voltage and the signal line,
   wherein the third switch is operatively coupled to a control signal and the third switch selectively electrically enabling the connection between the second pull-up voltage and the signal line through the third resistor based on the control signal.

3. The device of claim 1, further comprising:
   a fourth switch operatively between an output terminal and the signal line,
   wherein the fourth switch is operatively coupled to a control signal and the fourth switch selectively connects the signal line and the output terminal based on the control signal.

4. The device of claim 1 wherein the first resistor is a 1.0KΩ resistor and the second resistor is a 2.7KΩ resistor.

5. The device of claim 2 wherein the second pull-up voltage is equal to the pull-up voltage.

6. The device of claim 1 wherein the first switch is an NMOS transistor and the second switch is a NMOS transistor.

7. The device of claim 2 wherein the third switch is an NMOS transistor.

8. The device of claim 3 wherein the fourth switch is a PMOS transistor.

9. The device of claim 8 further comprising:
   an inverter operatively coupled between the control signal and the fourth switch.

10. A method of automatically providing variable resistance comprising:
    comparing a control voltage and a reference voltage;
    selectively pulling-up a signal line to a pull-up voltage through a first resistor and a first switch operatively connected in series if the comparison has a first outcome; and
    selectively pulling-up the signal line to the pull-up voltage through a second resistor and a second switch operatively connected in series if the comparison has a second outcome.

11. The method of claim 10 further comprising:
    receiving a control signal; and
    selectively pulling-up the signal line to a second the pull-up voltage through a third resistor based on the control signal.

12. The method of claim 10 further comprising:
    receiving a control signal; and
    selectively connecting the signal line and an output terminal based on the control signal.

13. An apparatus for automatically providing variable resistance comprising:
    means for comparing a control voltage and a reference voltage;
    means for selectively pulling-up a signal line to a pull-up voltage through a first resistor and a first switch operatively connected in series if the comparison has a first outcome; and means for selectively pulling-up the signal line to the pull-up voltage through a second resistor and a second switch operatively connected in series if the comparison has a second outcome.

14. The apparatus of claim 13 further comprising:
means for receiving a control signal; and
means for selectively pulling-up the signal line to a second the pull-up voltage through a third resistor based on the control signal.

15. The apparatus of claim 13 further comprising:
means for receiving a control signal; and
means for selectively connecting the signal line and an output terminal based on the control signal.

16. A system for automatically varying resistance comprising:
a voltage supply for supplying a reference voltage and an operating voltage;
a signal line requiring a pull-up resistance of a differing value depending on the operating voltage;
a comparator for comparing the reference voltage and the operating voltage;
a first switch operatively coupled to the comparator;
a first resistor operatively coupled with the first switch in a series connection between a pull-up voltage and a signal line;
a second switch operatively coupled to the comparator; and
a second resistor operatively coupled in a series connection with the second switch between the pull-up voltage and the signal line,
wherein the first switch selectively electrically enabling the connection between the pull-up voltage and the signal line through the first resistor based on the comparison between the reference voltage and the operating voltage and the second switch selectively electrically enabling the connection between the pull-up voltage and the signal line through the second resistor based on the comparison between the reference voltage and the operating voltage.

17. The system of claim 16 further comprising:
a third resistor operatively coupled in a series connection with a third switch between a second pull-up voltage and the signal line,
wherein the third switch is operatively coupled to a control signal and the third switch selectively electrically enabling the connection between the second pull-up voltage and the signal line through the third resistor based on the control signal.

18. The system of claim 16, further comprising:
a fourth switch operatively between an output terminal and the signal line,
wherein the fourth switch is operatively coupled to a control signal and the fourth switch selectively connects the signal line and the output terminal based on the control signal.

19. The system of claim 16 wherein the first resistor is a 1.0Kω resistor and the second resistor is a 2.7Kω resistor.

20. The system of claim 17 wherein the second pull-up voltage is equal to the pull-up voltage.

21. The system of claim 16 wherein the first switch is an NMOS transistor and the second switch is a NMOS transistor.

22. The system of claim 17 wherein the third switch is an NMOS transistor.

23. The system of claim 18 wherein the fourth switch is a PMOS transistor.

24. The system of claim 23 further comprising:
an inverter operatively coupled between the control signal and the fourth switch.

25. An apparatus for providing variable resistance, comprising:
a voltage supply for supplying a reference voltage and an operating voltage;
a signal line requiring a pull-up resistance of a differing value depending on the operating voltage;
a comparator for comparing the reference voltage and the operating voltage;
a first switch operatively coupled to the comparator;
a first resistor operatively coupled with the first switch in a series connection between a pull-up voltage and a signal line;
a second switch operatively coupled to the comparator;
a second resistor operatively coupled in a series connection with the second switch between the pull-up voltage and the signal line,
wherein the first switch selectively electrically enabling the connection between the pull-up voltage and the signal line through the first resistor based on the comparison between the reference voltage and the operating voltage and the second switch selectively electrically enabling the connection between the pull-up voltage and the signal line through the second resistor based on the comparison between the reference voltage and the operating voltage;
the signal line requiring a bias voltage at an insertion time;
a bias control signal indicating the insertion time;
a third resistor operatively coupled in a series connection with a third switch between a bias voltage and the signal line,
wherein the third switch is operatively coupled to the bias control signal and the third switch selectively electrically enabling the connection between the bias voltage and the signal line through the third resistor based on the bias control signal;
the signal line requiring a connection to an auxiliary output terminal at a dual-load time;
a dual-load control signal indicating the dual-load time; and
a fourth switch operatively between the auxiliary output terminal and the signal line,
wherein the fourth switch is operatively coupled to the dual-load control signal and the fourth switch selectively connects the signal line and the auxiliary output terminal based on the dual-load control signal.

26. A computer for automatically providing variable resistance comprising:
a comparator for comparing a reference voltage to an operating voltage;
a first switch operatively coupled to the comparator;
a first resistor operatively coupled with the first switch in a series connection between a pull-up voltage and a signal line;
a second switch operatively coupled to the comparator; and
a second resistor operatively coupled in a series connection with the second switch between the pull-up voltage and the signal line, wherein the first switch selectively electrically enabling the connection between the pull-up voltage and the signal line through the first resistor based on the comparison between the reference voltage and the operating voltage and the second switch selectively electrically enabling the connection between the pull-up voltage and the signal line through the second resistor based on the comparison between the reference voltage and operating voltage.

27. A method of automatically varying resistance comprising:

comparing a control signal and a reference signal;

pulling-up a signal line to a pull-up signal through a first resistor and a second resistor operatively connected in series if the comparison has a first outcome; and pulling up the signal line to the pull-up signal through only the second resistor if the comparison has a second outcome.

28. A method of automatically varying resistance comprising:

comparing a control voltage and a reference voltage;

pulling-up a signal line to a pull-up voltage through a first resistor if the comparison has a first outcome; and pulling up the signal line to the pull-up voltage through a second resistor operatively connected in parallel with the first resistor if the comparison has a second outcome.

29. A device for automatically providing variable resistance comprising:

a comparator for comparing a reference signal to an operating signal;

a first switch operatively coupled to the comparator;

a first resistor operatively coupled with the first switch in a series connection between a pull-up signal and a signal line;

a second switch operatively coupled to the comparator; and a second resistor operatively coupled in a series connection with the second switch between the pull-up signal and the signal line, wherein the first switch selectively electrically enabling the connection between the pull-up signal and the signal line through the first resistor based on the comparison between the reference signal and the operating signal and the second switch selectively electrically enabling the connection between the pull-up signal and the signal line through the second resistor based on the comparison between the reference signal and operating signal.

* * * * *

UNITED STATES PATENT AND TRADEMARK OFFICE
CERTIFICATE OF CORRECTION

PATENT NO. : 6,441,595 B1
DATED : August 27, 2002
INVENTOR(S) : Gerald R. Pelissier et al.

It is certified that error appears in the above-identified patent and that said Letters Patent is hereby corrected as shown below:

Column 1,
Line 28, replace "modem" with -- modern --.

Column 2,
Lines 3-17, replace all appearances of "ω" with -- Ω --.
Line 33, replace all appearances of "ω" with -- Ω --.
Line 45, replace "ω" with -- Ω --.

Column 4,
Lines 42-58, replace all appearances of "ω" with -- Ω --.

Column 5,
Lines 10-18, replace all appearances of "ω" with -- Ω --.

Column 6,
Line 26, replace all appearances of "ω" with -- Ω --.

Column 7,
Line 60, replace all appearances of "ω" with -- Ω --.

Signed and Sealed this

Thirteenth Day of May, 2003

JAMES E. ROGAN
*Director of the United States Patent and Trademark Office*